(12) United States Patent
Mathiassen

(10) Patent No.: US 6,717,318 B1
(45) Date of Patent: Apr. 6, 2004

(54) ELECTRIC MOTOR

(75) Inventor: Ole Mathiassen, Thisted (DK)

(73) Assignee: Danfoss Drives A/S, Graasten (DK)

( * ) Notice: Subject to any disclaimer, the term of this patent is extended or adjusted under 35 U.S.C. 154(b) by 0 days.

(21) Appl. No.: 09/331,501

(22) PCT Filed: Dec. 11, 1997

(86) PCT No.: PCT/DK97/00564
§ 371 (c)(1),
(2), (4) Date: Sep. 27, 1999

(87) PCT Pub. No.: WO98/29934
PCT Pub. Date: Jul. 9, 1998

(30) Foreign Application Priority Data

Dec. 14, 1996 (DE) .......................... 196 52 186

(51) Int. Cl.⁷ ................................................ H02K 1/00
(52) U.S. Cl. .................... 310/216; 310/179; 310/258
(58) Field of Search ................ 310/216, 179, 310/180, 208, 258, 259, 51, 181, 190, 191, 192, 162

(56) References Cited

U.S. PATENT DOCUMENTS

| 4,041,604 | A | * | 8/1977 | Ackley | 29/628 |
| 4,220,883 | A | * | 9/1980 | Padoan | 310/216 |
| 4,450,399 | A |   | 5/1984 | Tanaka | |
| 4,604,537 | A |   | 8/1986 | Layh | |
| 4,656,379 | A | * | 4/1987 | McCarty | 310/181 |
| 4,963,778 | A |   | 10/1990 | Jensen et al. | |
| 5,015,905 | A | * | 5/1991 | Koharagi et al. | 310/186 |
| 5,029,265 | A |   | 7/1991 | Staats | |
| 5,729,071 | A | * | 3/1998 | Steiner | 310/254 |
| 5,852,338 | A | * | 12/1998 | Boyd, Jr. et al. | 310/89 |
| 5,925,963 | A | * | 7/1999 | Yang | 310/259 |

FOREIGN PATENT DOCUMENTS

DE   1903410   9/1970

* cited by examiner

Primary Examiner—Thanh Lam
(74) Attorney, Agent, or Firm—Barnes & Thornburg

(57) ABSTRACT

The invention concerns an electric motor with a stator, in whose bore a rotor is arranged, and with a control arrangement having at least one coil with a core passed by the motor current. The coil shall be arranged in a space saving manner without interfering too much with the magnetic field of the motor. To solve this problem the core of the coil is arranged on the stator whose iron is used for a magnetic circuit.

19 Claims, 3 Drawing Sheets

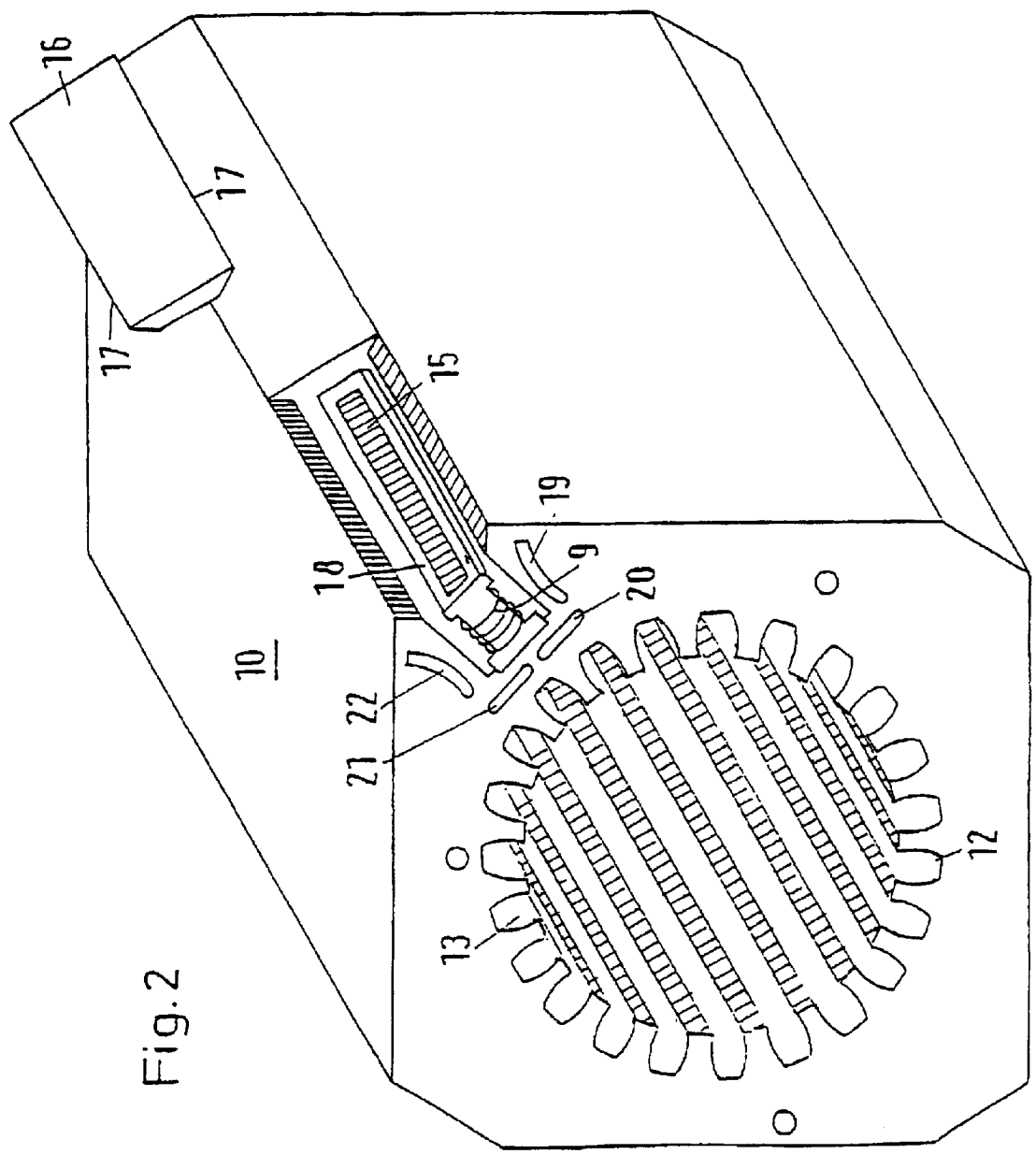

ELECTRIC MOTOR

BACKGROUND OF THE INVENTION

The invention concerns an electric motor with a stator having a bore, in which a rotor is arranged, and with a control arrangement having at least one coil with a core, the coil being loaded by the motor current.

The control enables changes in the supply to the motor of electric current and electric voltage, hereby changing the speed or torque. For this purpose, the control arrangement can be a controlled rectifier, a controlled inverter, a frequency converter etc. Usually, the control arrangement is made as power electronics.

Independently of the exact embodiment of the control arrangement, inductivities are often required, which are realised by way of coils. An example is an intermediary circuit coil, which is loaded by the intermediary circuit current, i.e. the current between the rectifier and the inverter, in a frequency converter. This means that the total current flowing through the motor also flows through the intermediary circuit coil. Another example of a coil loaded by the motor current is a filter coil, which is arranged in the input area of the control arrangement with the purpose of reducing the emission of electrical noise signals. Also output and motor coils could be imagined, which are arranged in the output area of the control arrangement to protect the motor against voltage transients, which could damage the isolation of the motor. The motor current also flows through these coils, even when only the current of one phase is concerned.

Common for all these coils is, however, that due to the relatively large current load they emit a substantial amount of heat and are correspondingly large, meaning that they require much room. As in many cases the control arrangement must be integrated in the motor, i.e. form one unit together with the motor, the placing of the coil represents a problem. To solve this problem DE 36 42 724 proposes that the intermediary circuit coil of a frequency converter is placed in the motor housing in a way that it is axially displaced in relation to the stator and the rotor and surrounds an extension of the rotor shaft. The rotor shaft then forms the core of the coil. The intermediary circuit coil is cooled by the air flow from a ventilator, which is also arranged on the rotor shaft.

This solution is room saving, but still the coil takes relatively much room in the construction of this motor. The motor shaft must be extended by at least the coil width, which means an additional increase of the size of the motor. The extension of the rotor shaft may cause stability problems. Additionally, the magnetic flux through the rotor shaft is difficult to control. There is a risk that undesired mutual influences with the magnetic field of the motor may occur.

SUMMARY OF THE INVENTION

It is the task of the invention to arrange the coil in a room or space saving way without causing significant interference with the magnetic design of the motor.

In an electric motor as mentioned in the introduction this task is solved in that the core of the coil is arranged on the stator whose iron is used for a magnetic circuit.

The fact that the iron of the stator is used for the magnetic circuit permits realisation of the desired inductivity of the coil, even when only a limited room is available. However, the iron of the stator is available anyway. The coil is arranged on the outside of the stator, i.e. separated from the stator bore. This does not necessarily mean that the core is fitted on the outside of the stator.

It can also be arranged in the stator, if an access from the outside is possible, at least during fitting. As the iron of the stator "short-circuits" the field lines of both coil and stator winding, a mutual interference does not take place. If a mutual influencing of the fields should occur, it would still be within tolerable frames. As iron is known to be a relatively good heat conductor, the heat produced by the coil can be dissipated relatively fast. It can distribute over the stator, so that the stator surface is available as emitting surface. Also with higher power consumption an overheating is avoided.

In a preferred embodiment the core is part of the stator. Thus the core is made in one piece with the stator, e.g. as a projection of the stator. In this way an air gap is prevented, which would arise by fixing the core on the stator iron, and the magnetic resistance of the magnetic circuit is kept small. The coil can more easily be integrated in the motor.

Preferably, the stator has at least one flux restriction for the separation of the magnetic flux of the coil on one side and of the stator winding on the other side. If the prevention of mutual interference of the fields of coil and stator winding is even more strongly desired, the flux restriction assists in making a measure available, with which this influencing is almost eliminated or at least drastically reduced. The flux restriction increases the magnetic resistance in the surroundings of the coil, and thus screens the field of the coil against the field of the stator winding and vice versa.

In a preferred embodiment the flux restriction is made as a recess in the stator, which is filled with a magnetically non- or poorly conducting material. This recess could e.g. be an air gap. For reasons of stability it could be expedient to arrange several air gaps next to each other. In principle, the remaining ribs in the iron of the stator permit the penetration of the magnetic field. However, these interferences are negligible.

Preferably, a cooling medium can flow through the recess. This could e.g. simply be cooling air. In case that a fluid cooled motor is concerned, this cooling medium could also be oil or another fluid. Thus the recess does not only screen the magnetic field of the coil from that of the stator winding, it also permits the immediate removal of the heat produced in the coil.

Advantageously, the core only extends over part of the axial length of the stator. Thus the coil size can be adapted to the requirements, without having to change the point where the core is arranged. It is thus not necessary to extend the coil over the whole axial length of the core, even though this is of course possible.

Advantageously, in front view the stator has a substantially rectangular cross section and the coil is arranged in the area of a corner of this cross section. To improve assembly or generally the handling of motors, the stator has in many cases a rectangular or even square cross section. It is obvious that in the area of the diagonals, i.e. in the area of the corners of this rectangle or square, the stator has a larger diameter, even though this is often not required for magnetic or electrical purposes. This somehow abundant iron and the room can be used for the coil and its core, respectively, which is very space or room efficient.

Advantageously, the stator and the core are formed with laminated sheet plates. This is especially advantageous with motors operated with AC or three-phase current. In a known way, the formation of eddy-currents is prevented.

Further, it is especially preferred that the core is formed by the same sheet blank tool used for forming the laminated sheets of the stator. It is relatively simple to create the shape or profile of the sheets. Normally, such laminated sheets are punched. Providing the punching tool with a corresponding cutting line will enable a relatively simple creation of the shape of the laminated sheets, so that the core will arise automatically when laminating these sheets to assemble the stator.

In this connection it is advantageous that in the axial direction the stator consists of at least two different types of laminated sheet plates having different shapes, of which one has no core forming area. The laminated sheet plates with core forming area then form the core. However, they only extend over a predetermined axial length of the stator, as not all sheets can be made so. The remaining length is then free of such a core. Here the stator then corresponds to a normal motor.

Advantageously, the coil is fitted on a coil carrier which can be pushed onto the core. This simplifies the production. The coil can be prefitted. E.g. it can be wound on the coil carrier, before the coil carrier is pushed onto the core. The coil carrier can e.g. be made of a synthetic material, so that the magnetic properties are not or not significantly influenced. The hereby occurring distance between coil and core can be kept small enough, when the thickness of the coil carrier is reduced.

In a preferred embodiment it is provided that the core is substantially oriented in the radial direction. This orientation is especially recommended, when the core is arranged in the corner area of the rectangular or square cross section shape. This provides that a relatively large iron area of the stator is available for the magnetic circuit.

It is particularly preferred that the core is arranged in a volume in the stator, which volume is closed by a cover. Thus, the magnetic circuit can be closed by the cover. Any air gaps remaining between cover and stator are so small, that they can be accepted.

In order to additionally reduce or even eliminate such air gaps, the cover can be welded onto the stator. In this case the coil with core is integrated in the stator. This example clearly demonstrates that the stator with coil does not necessarily have larger dimensions than the stator without coil.

In an alternative embodiment the core is substantially parallel to one outside of the stator. This also enables formation of the desired magnetic circuit.

In this connection it is preferred that the core is arranged offset from the outside inwards. Thus sufficient room will be available on the outside for the admission of the coil windings, without having to increase the external dimensions of the stator.

It is also advantageous if the core has the profile of an EI-core. This facilitates the design, as the calculation opportunities of such cores are known.

Preferably, several of the coils each have their own core. These coils can then be distributed around the stator, or, if each coil does not require the total axial length of the stator, they can be arranged in the axial direction. The decision of using one or more coils depends on the design of the machine.

In a particularly preferred embodiment it can be provided that at least two of the coils are part coils of a function coil from the group of intermediary circuit coil, filter coil, noise suppression coil or motor coil, whereby the motor coils are arranged between the motor connections and the control arrangement. In many cases it can be advantageous, for mechanical, magnetic, electrical or thermal reasons, to divide a function coil, which can in an electrical principal circuit diagram be called a concentrated element, into several, physically separated part coils. This is possible by using several coils.

Alternatively, the coils are at least two different function coils from the group of intermediary circuit coil, filter coil, noise suppression coil or motor coil, whereby the motor coils are arranged between the motor connections and the control arrangement. Then, several of the required a * coils can be arranged in the stator, without having to increase the dimensions of the control arrangement and the motor.

BRIEF DESCRIPTION OF THE DRAWINGS

In the following the invention is described on the basis of preferred embodiments in connection with the drawings, showing:

FIG. 2 a perspective view of a stator of an electric motor

BRIEF DESCRIPTION OF THE PREFERRED EMBODIMENTS

Figure 1:
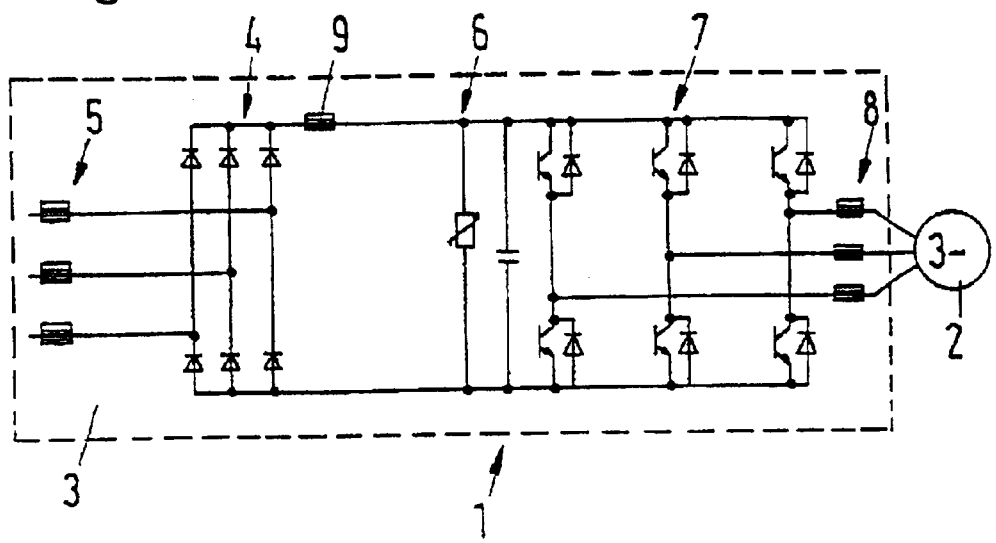
FIG. 1 a schematic view of a circuit arrangement

A circuit arrangement 1 in FIG. 1 has a motor 2 and a control unit 3. The control unit 3 is a frequency converter, i.e. it comprises a rectifier 4 supplied via filter coils 5 from a three-phase mains. Via an intermediary circuit 6 the rectifier 4 is connected with an inverter 7 driving the motor 2 via motor or output coils 8. The purpose of the output coils is, e.g., to protect the motor 2 against any occurring voltage transients, which could damage the isolation in the motor 2. The intermediary circuit 6 also comprises an intermediary circuit, coil 9.

Both the filter coils 5 and the output coils 8 are loaded by a part of the motor current. In both cases, the part is the current of one phase. The intermediary circuit coil 9 is loaded by the total motor current. Therefore, all these coils 5, 8, 9 must be dimensioned with regard to the currents to be absorbed and the heat thus produced. On one hand this requires much room, and on the other hand it involves certain thermal problems.

Taking the intermediary circuit coil 9 as an example, it will now be explained how such coils can be arranged in the motor 2, without requiring much additional room or without requiring any additional room at all.

FIG. 2 shows the stator 10 of the motor 2, which stator is formed with laminated sheet plates, i.e. numerous sheets piled on top of each other. The piling direction corresponds to the axial direction of the stator 10. Such a plate is shown e.g. in FIG. 3.

The stator 10 has several stator slots 12 arranged around a bore 13, in which a rotor is arranged rotatably (not shown in detail). This rotor may be a squirrel-cage rotor. The stator slots 12 also hold the stator winding (not shown), which produces a circulating magnetic field, which again drives the rotor.

The cross section of the stator 10 has the shape of a square (or an ordinary rectangle), by which, in this case, the corners are bevelled. Correspondingly, the radial extension of the stator iron in the diagonal direction, i.e. in the area of the edges, is larger than in the area of the stator sides.

This fact can be utilised when arranging the intermediary circuit coil 9.

Figure 3:
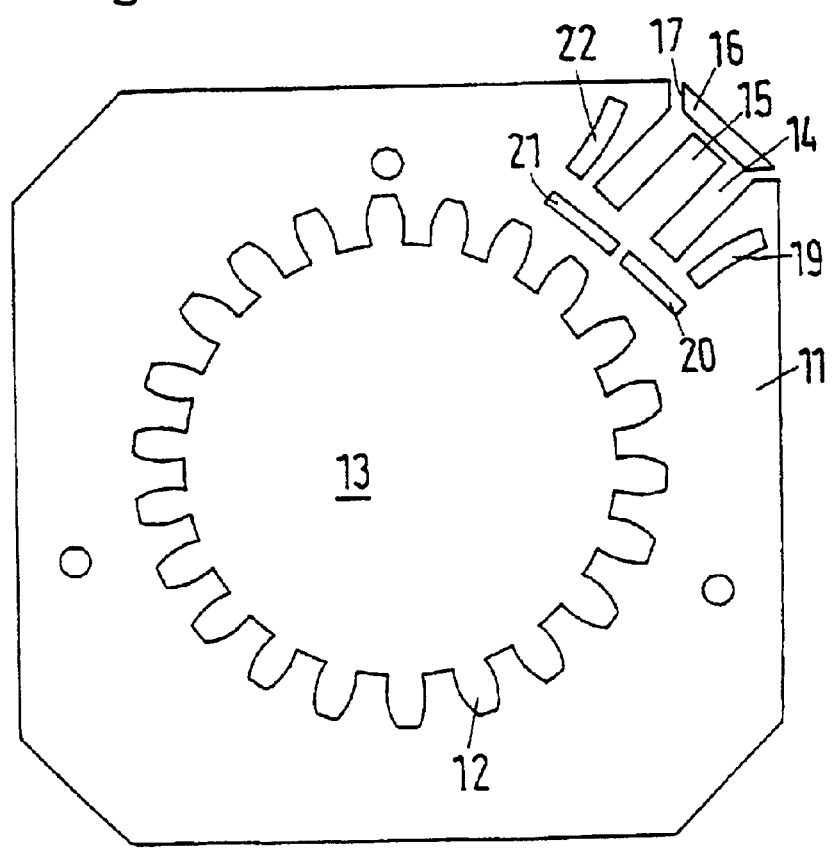
FIG. 3 a laminated sheet blank

As can be seen from FIGS. 2 and 3, the sheets forming the stator have a special shape. In the area of the upper right corner (FIG. 3) a volume 14 is provided, inside which a core 15 is arranged as projection. The volume 14 can be closed by a cover 16, whose sides 17 can be welded onto the sheets 11. Of course this welding is not made until the sheets 11 have been assembled to form the stator 10. Correspondingly, the production of the volume 14 and the core 15 only requires a corresponding design of the blank tool, viz. a corresponding design of the blank or cutting line. The core 15 practically emerges automatically during manufacturing of the stator 10.

FIG. 2 shows that the intermediary circuit coil 9 is wound on a coil carrier 18, which can be made of plastics and pushed onto the core 15. The intermediary circuit coil 9 can also be prefabricated. By means of projections the coil carrier 18 can then be made so that the wound intermediary circuit coil 9 cannot slide downwards.

The motor is a 7.5 HP, three-phase asynchronous motor. The current flowing into the intermediary circuit 6 after the B6-rectifier 4 has an RMS value of 13.7 A and pulsates at a frequency of 300 Hz. Correspondingly, the intermediary circuit coil 9 is dimensioned to 1 mH. As appears from FIG. 3, the core has the profile of an EI-core. Thus the dimensioning of the coil can be made as with an ordinary EI-core. Correspondingly, the intermediary circuit coil 9 has ten windings. The coil length is 109.5 mm, and the average length of a winding is 265 mm.

The coil wound on the coil carrier 18 is fitted on the core 15 together with the coil carrier 18. Then the cover 16 is fitted on the volume 14 and fixed by welding. Even though an intermediary circuit coil 9 is arranged in the stator 10, the dimensions of the stator are not increased. However, the stator also serves the purpose of distributing and dissipating the heat produced by the intermediary circuit coil 9. The axial length of the intermediary circuit coil 9 is smaller than the axial length of the stator 10. Thus the coil length only covers a share of the total length of the stator. Of course this can be changed to adapt to individual requirements. In the extreme case, the coil might reach the length of the stator 10.

As can be seen from FIGS. 2 and 3, the sheets 11 have various recesses 19 to 22 in the area of the volume 14. When the sheets are assembled, these holes 19 to 22 will form channels.

These channels 19 to 22 have two functions. For one they are flux restrictions for separation of the magnetic flux of the intermediary circuit coil 9 from the magnetic flux produced by the stator winding. This separation is simply achieved in that the magnetic resistance between the areas, in which these two fields spread, is increased. The ribs remaining between the channels permit the passing of field lines. However, normally these are negligible. Further, the channels formed by the holes 19 to 22 can also be used as flow path for a cooling medium, e.g. air, oil or another fluid, or gas, for a quick dissipation of the heat produced by the intermediary circuit coil 9.

Figure 4:
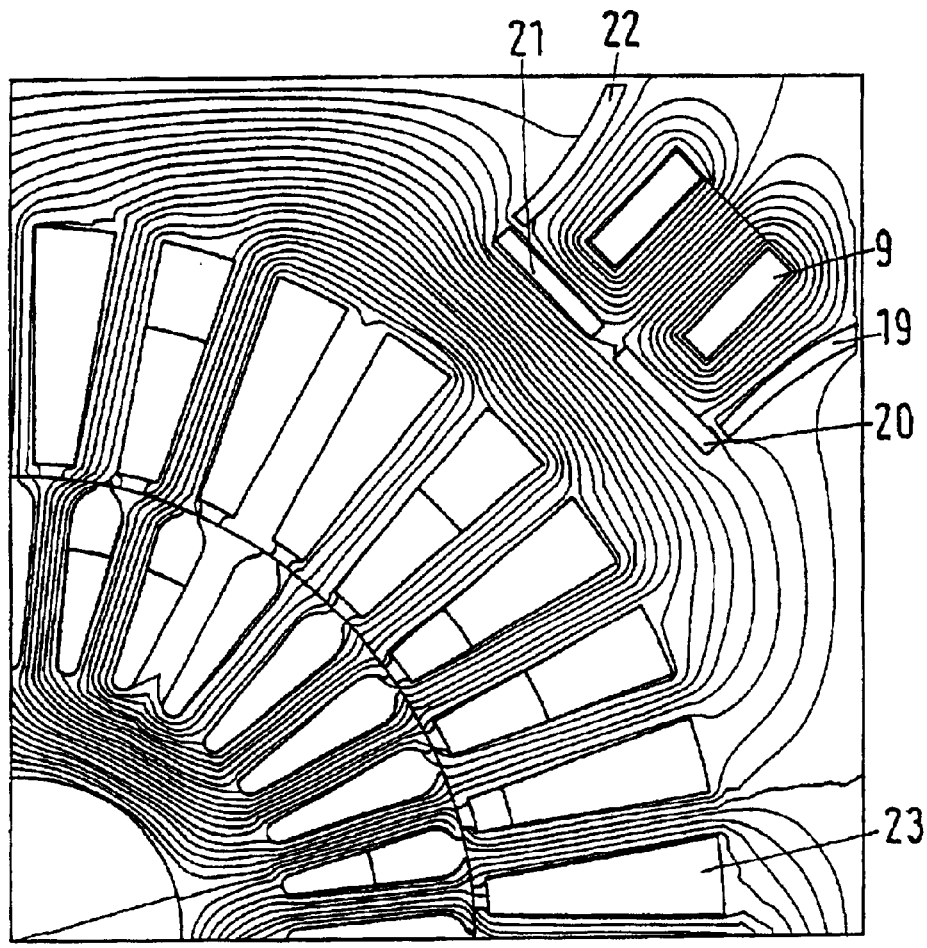
FIG. 4 a field line drawing of a different motor

To make the function of the flux restrictions formed by the holes 19 to 22 more clear, the field line picture of the magnetic fields of intermediary circuit coil 9 and stator winding 23 are shown in FIG. 4. It can be seen that these two fields are substantially isolated, by which the isolation occurs along the recesses 19 to 22. In this embodiment a stator with a different number of slots is shown.

Figure 5:
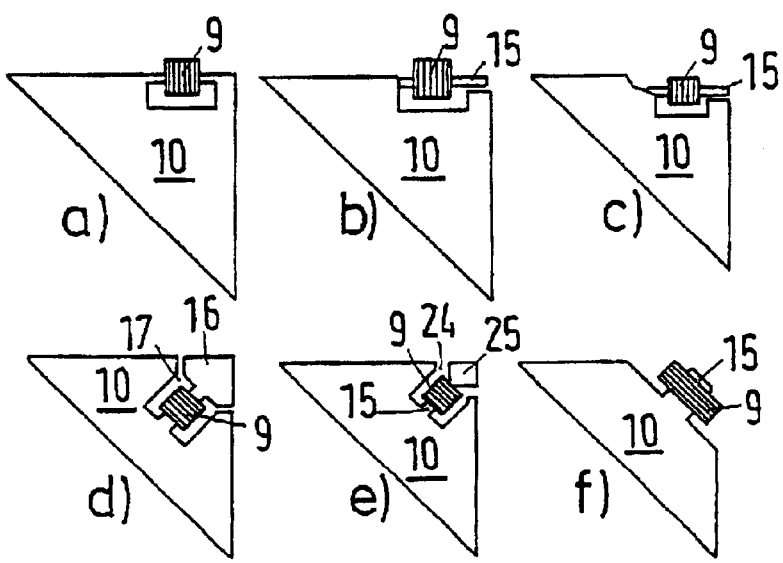
FIG. 5 various alternative laminated sheet blanks

FIG. 5 shows several possible arrangements of the coil 9 in a corner of the stator 10. The coils in FIGS. a to c are arranged horizontally, i.e. their cores are substantially parallel to a side of the stator. In FIG. 5a the core is made in one piece with the stator, i.e. the coil 9 must be threaded after the assembling of the individual sheets. In FIG. 5b the core 15 is a separate unit fitted on the stator 10, e.g. by welding. Other ways of fixing are also possible. Compared with FIG. 5b, the core 15 in FIG. 5c is a little offset to the inside. Thus the outer contour of the coil 9 does not protrude from the outer contour of the stator 10.

FIG. 5d substantially corresponds to the embodiment according to FIG. 2 and 3. Here the cover 16 is welded onto the sides 17 of the stator 10.

FIG. 5e shows an embodiment, in which air gaps 24 remain between a head 25 on the core 15 and the rest of the stator 10. Through the air gaps 24 the coil can be wound on the core.

FIG. 5f shows a solution, in which the coil 9 is fixed on a core 15, which is just a projection on the stator 10. Here the magnetic circuit has relatively large air paths.

All solutions in FIG. 5 are provided with flux restrictions (not shown), e.g. as formed by the recesses 19 to 22. In the extreme case it is possible, as shown in FIG. 5f, to wind the coil 9 on a core, which is then fixed on the outside of the stator 10.

There is no limitation with respect to placing coils in only one corner of the stator 10. Of course, all four corners of the stator 10 are available for the fixing of coils. It may be expedient to divide one coil, e.g. the intermediary circuit coil, into several part coils, if, for mechanical, magnetic, electrical or thermal reasons, advantages are involved in this. It is also possible to arrange the intermediary circuit coil 9 in one corner and the filter coils 5 or output coils 8 in another corner. Several design opportunities are given here.

FIG. 2 shows that the intermediary circuit coil 9 is arranged at an axial end of the stator 10. However, this is not necessarily required. The intermediary circuit coil 9, and any other coil, can also be arranged in the axial centre of the stator 10. This position can also be expedient for thermal reasons, for improved cooling of the coil on the one hand; and for reducing voltages occurring because of an unevenly distributed thermal load over the length of the stator 10 on the other hand.

What is claimed is:

1. An electric motor comprising a stator having a bore in which a rotor is located, and having a motor control arrangement connected to the motor, the control arrangement having at least one coil with a core, the coil being located in an intermediate circuit of the control arrangement between a rectifier and an inverter of the control arrangement and being loaded by d.c. current of the motor, the core of the coil being located on the stator, and the stator being comprised of iron, the iron being used for a magnetic circuit for the coil.

2. Motor according to claim 1, in which the core is part of the stators.

3. Motor according to claim 1, in which the stator has at least one flux restriction for separation of magnetic flux of the coil on one side and magnetic flux of the stator on the other side.

4. An electric motor comprising a stator having a bore in which a rotor is located, and having a control arrangement having at least one coil with a core, the coil being loaded by current of the motor, the core of the coil being located on the stator, and the stator being comprised of iron, the iron being used for a magnetic circuit, the stator having at least one flux restriction for separation of magnetic flux of the coil on one side and magnetic flux of the stator winding on the other side, the flux restriction comprising at least one hole in the stator, which is filled with a magnetically non- or poorly conducting material.

5. Motor according to claim 4, including a cooling medium in the hole.

6. Motor according to claim 1, in which the core only extends over part of the axial length of the stator.

7. Motor according to claim 1, in which the stator has a substantially rectangular cross section and the coil is located in a corner of this cross section.

8. Motor according to claim 1, in which the stator and the core are formed with laminated sheet plates.

9. Motor according to claim 8, in which the core is formed by the same process used for forming the laminated sheets of the stator.

10. Motor according to claim 8, in which in an axial direction the stator consists of at least two different types of laminated sheet plates having different shapes, of which one has no core forming area.

11. Motor according to claim 1, in which the coil is fitted on a coil carrier shaped to be pushed onto the core.

12. Motor according to claim 1, in which the core is substantially oriented in a radial direction.

13. Motor according to claim 12, in which the core is located in a volume in the stator, which volume is closed by a cover.

14. Motor according to claim 13, in which the cover is welded onto the stator.

15. Motor according to claim 1, in which the stator has longitudinal outer sides, and the core of the control arrangement has a length which is substantially parallel to one of the outer sides of the stator.

16. Motor according to claim 15, in which the entire core of the control arrangement is offset inwardly from said one outer side.

17. Motor according to claim 1, including several coils, each coil having its own core.

18. Motor according to claim 17, in which at least two of the coils are part coils of a function coil from the group consisting of an intermediary circuit coil, filter coil, noise suppression coil or motor coil.

19. Motor according to claim 17, in which the coils are at least two different function coils from the group consisting of an intermediary circuit coil, filter coil, noise suppression coil or motor coil.

* * * * *